A. S. B. LITTLE.
GRID FOR PURIFIER BOXES.
APPLICATION FILED OCT. 24, 1913.

1,090,318.

Patented Mar. 17, 1914.
2 SHEETS—SHEET 1.

WITNESSES:
Harry A. Beimes
Jos. A. Michel

INVENTOR.
Archibald S. B. Little.
BY
ATTORNEY.

A. S. B. LITTLE.
GRID FOR PURIFIER BOXES.
APPLICATION FILED OCT. 24, 1913.
1,090,318.
Patented Mar. 17, 1914.
2 SHEETS—SHEET 2.
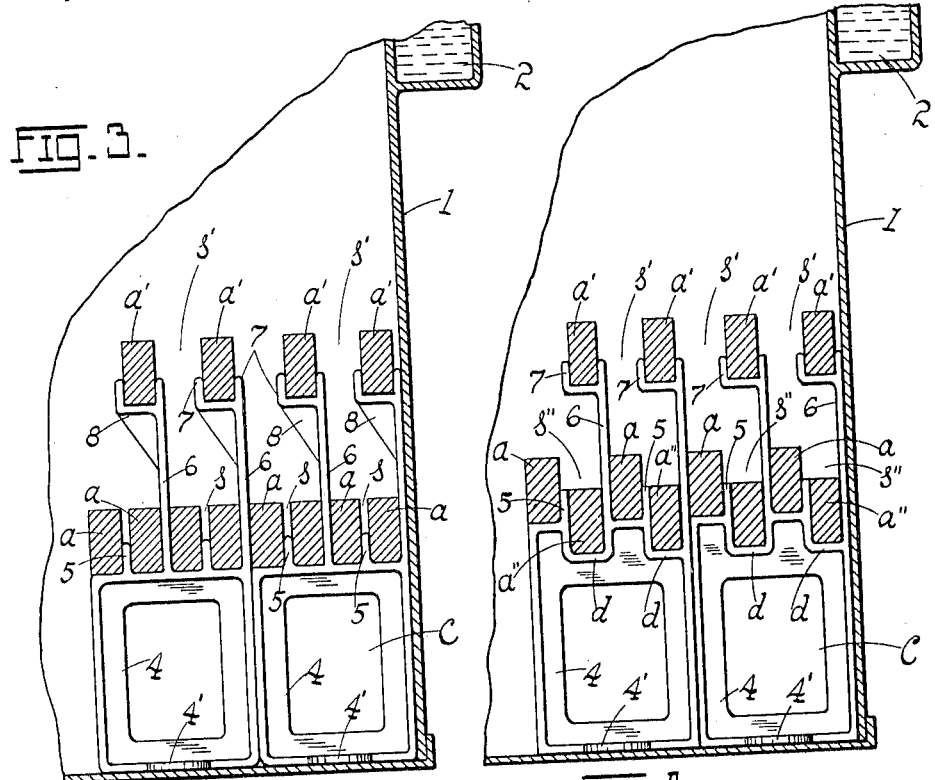
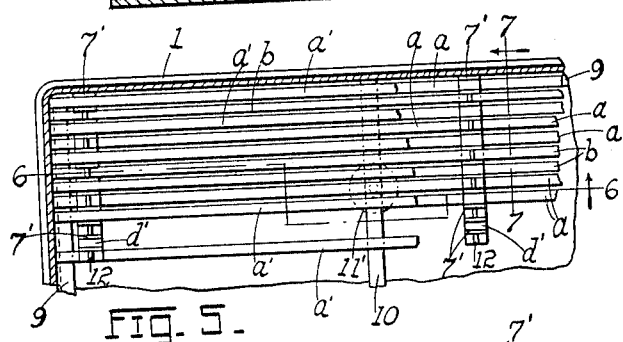
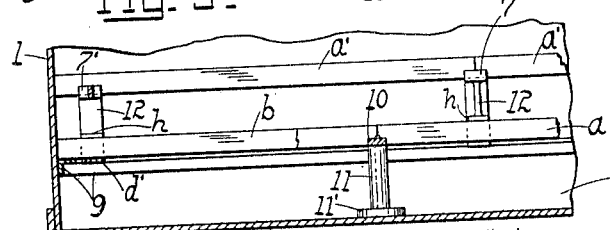
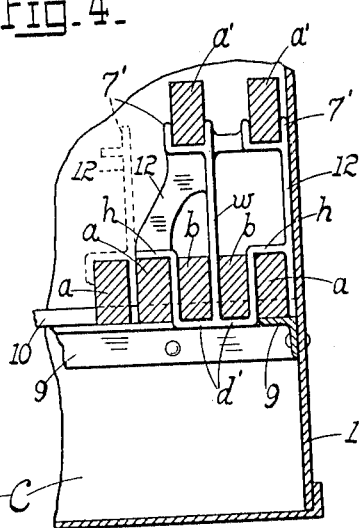
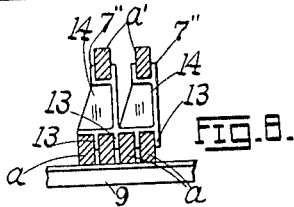
WITNESSES:
Harry A. Beimer
Jos. A. Michel
INVENTOR.
Archibald S. B. Little
BY
Emil Stares
ATTORNEY.

UNITED STATES PATENT OFFICE.

ARCHIBALD S. B. LITTLE, OF NASHVILLE, TENNESSEE.

GRID FOR PURIFIER-BOXES.

1,090,318. Specification of Letters Patent. Patented Mar. 17, 1914.

Application filed October 24, 1913. Serial No. 797,094.

*To all whom it may concern:*

Be it known that I, ARCHIBALD S. B. LITTLE, citizen of the United States, residing at Nashville, in the county of Davidson and State of Tennessee, have invented certain new and useful Improvements in Grids for Purifier-Boxes, of which the following is a full, clear, and exact description, reference being had to the accompanying drawings, forming a part hereof.

My invention has relation to improvements in grids for gas-purifier boxes; and it consists in the novel details of construction more fully set forth in the specification and pointed out in the claims.

Figure 1:
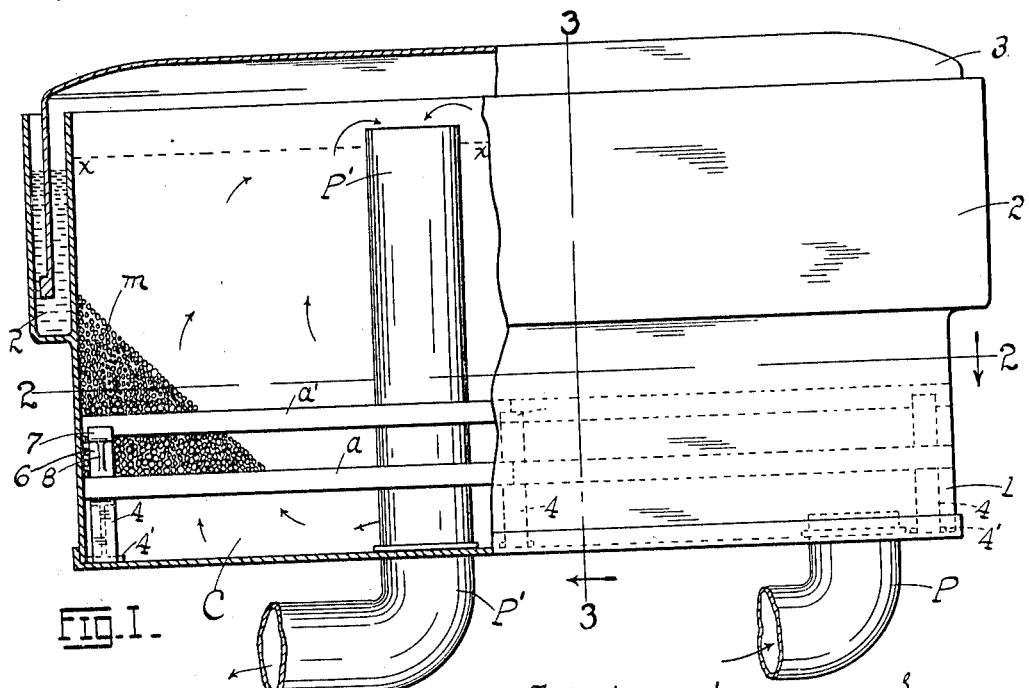
Figure 2:
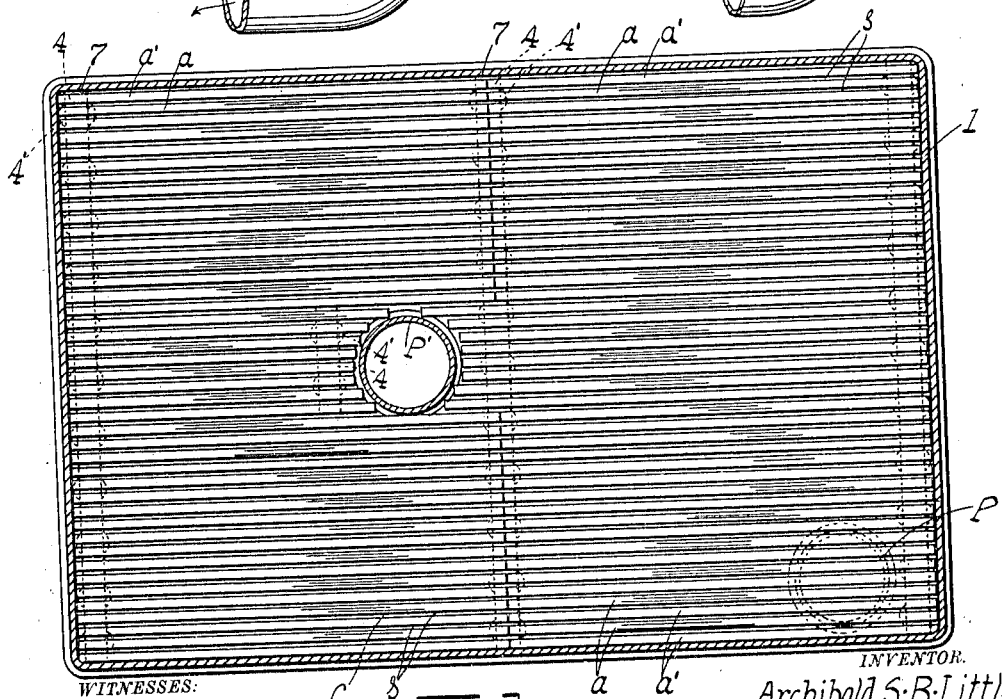

In the drawings, Figure 1 is a side elevation of a conventional purifier-box showing one form of my invention applied thereto, parts being broken away; Fig. 2 is a horizontal section on the line 2—2 of Fig. 1; Fig. 3 is an enlarged vertical transverse section on the line 3—3 of Fig. 1, taken below the water-lute or seal; Fig. 4 is a similar section showing a modified form of grid; Fig. 5 is a plan of a still further modification of grid; Fig. 6 is a vertical section on the zig-zag line 6—6 of Fig. 5; Fig. 7 is a vertical cross-section on the line 7—7 of Fig. 5; and Fig. 8 is a sectional detail showing a still further modification.

As well understood in the art, purifier boxes designed to remove sulfureted hydrogen from illuminating gas in the course of purification of the gas, are provided with grids or trays raised above the bottom of the box, said trays supporting the porous mass through which the gas passes, the mass being any suitable absorbent of $H_2S$, though in modern practice resort is had to oxid of iron, the mass being made porous by means of shavings, excelsior or other equivalent material, the whole being moistened so as to absorb to the greatest extent the sulfureted hydrogen gas filtered through the mass. With the ordinary grid as now constructed, the entire weight of the mass bears against the grid, thereby resulting in the packing of the bottom portions of the mass and thus rendering the same less permeable to the gas particularly where the gas contains undue quantities of tar, oil, moisture and suspended impurities generally. To take off the standard grids or trays, some part of the pressure caused by the superimposed mass of iron oxid (or its equivalent) resort was had to a style of grids known as the "hurdle" or vertical grids, but their action did not altogether cure the objection here referred to.

It is the object of my present invention not only to eliminate the old style of grid, (usually constructed of wooden rods, bars, or planks, bolted or otherwise secured together and spaced apart), which was an essential accompaniment of the vertical or "hurdle" design of grid, but to combine in a single structure, a grid which will possess not only all the virtues of the combined grids aforesaid, preventing as it does, the packing of the mass due to the pressure of the superincumbent weight, but possessing in addition the following advantages: It provides ready means of moving and fitting of the component parts of the grid; affords quick means of unloading the mass for cleaning the grids; affords means of combining with the main grid, a supplemental coarse grid which serves to support a portion of the load at points disposed in a plane above the main grid; it is susceptible of various modifications from a structural stand-point; it dispenses with the necessity of sub-dividing the mass into distinct layers; it maintains at all times a porous mass for the traverse of the gases; and finally the improvement presents further and other advantages which will be fully apparent from a detailed description of the invention which is as follows:—

Referring to the drawings, and for the present to Figs. 1 to 3 inclusive, 1 represents a conventional gas purifier box provided with a water seal 2 normally closed by an inverted float or hood 3 as well understood in the art, the said box having an intake pipe P for the impure gas and a discharge pipe P' for the purified gas, the gas traversing or passing through a charge of iron oxid or equivalent material $m$, the plane of whose upper surface is represented by the dotted line $x$—$x$, (Fig. 1). The features alluded to are well understood in the art and only a passing reference is made thereto in the present description. Disposed along the inner walls (the end walls in the present illustration) of the box and across the box between said walls, are a series of castings or grid-supports 4, whose upper faces or edges are provided with parallel ribs or tongues 5 (two to each casting in the form here used) spaced apart, one of the terminal walls of said casting and an intermediate tongue being extended upward so as to form standards or extensions 6, the upper free ends of the said extensions terminating in saddles or pockets 7 disposed on one side of each extension and preferably reinforced by ribs 8. Deposited on the castings 4 between the tongues 5 and the bases of the adjacent standards 6, and between the base of the standard of one casting and a tongue of an adjacent casting (the castings being placed one against the other) are stringers, timbers, or grid members $a$, the tongues being of a thickness so as to leave approximately a space $s$ of one-half inch between the timbers, the said timbers $a$ collectively forming the main and lower grid for the support of the bottom of the ore-mass $m$, the spaces $s$ permitting the gas to flow freely upward into the porous mass supported by the timbers. The pockets or saddles 7 support an upper row of timbers $a'$ spaced about four inches apart and collectively forming the upper supplemental coarse grid which operates to relieve the bottom grid $a$ of a portion of the entire load or weight of ore, and incidentally prevents the packing of the mass in the lower regions. Under the arrangement as shown, the timbers $a'$ directly overhang corresponding bottom timbers $a$, the spaces $s'$ between two consecutive timbers $a'$, $a'$, being directly or substantially directly over the next timbers $a$ of the series. The several castings or supporting members 4 are provided with feet 4' whereby a sure footing is insured therefor; and in the present case a number of such castings will necessarily be installed on each side of the exhaust or discharge pipe P' to afford support for the timbers terminating at such pipe (Fig. 2).

With the construction of the supports 4 as described, the ore-supporting surfaces of the members $a$ of the lower grid will necessarily be disposed in the same horizontal plane, resting as they do on a surface likewise disposed in a horizontal plane, and the several timbers being of equal depth. It is apparent however, that if a portion of the timbers constituting the lower grid be disposed in a different horizontal plane from the plane of disposition of another portion, one of the objects sought by my invention, to-wit:—the prevention of packing of the material, would be realized to even a greater extent than with a construction such as shown in the forms already described, and illustrated in Figs. 1, 2 and 3. A modification which possesses this virtue to an eminent degree is illustrated in Fig. 4. In this figure the castings or supports 4 are provided with ribs or tongues 5, and extensions or standards 6 and pockets 7 as in the first form described, but in the modified form referred to the casting is provided with depressions $d$ between the tongues and extensions, the bases of said depressions lying in a plane depressed below the plane of the upper edge of the standard, so that when the timbers $a$, $a''$, constituting the lower grid are deposited on the top of the casting and in the depressions respectively, the said timbers will be disposed in staggered relation, those ($a''$) resting in the depressions being disposed in a plane below those ($a$) resting on the top edge or top of the casting, the timbers $a'$ constituting the coarse supplemental or upper grid being supported in the pockets 7 as before. In said Fig. 4 the depressions $d$ are of a depth to bring the upper faces of the timbers $a''$ supported therein flush with the upper edges of the tongues 5, the spaces $s''$ between the extensions 6 and the adjacent faces of the timbers $a$ resting on the top edges of the castings being equal to the space between a tongue 5 and extension 6, plus the thickness of a tongue. The spaces between the timbers $a''$ resting in the depressions $d$ and those ($a$) supported on the top edges of the castings 4 are the same as the corresponding spaces $s$ between the timbers $a$ in the first form described, as quite obvious from the drawings. In fact, the modification just referred to is in all respects the same as the first form described except in the matter of the difference in the planes of disposition of the timbers $a$, $a''$, such staggered arrangement serving to support the mass at different points in two distinct and superposed planes and hence insuring against an undue packing of the mass, which in addition is supported by the timbers $a'$ forming the coarse upper supplemental grid.

Whether the mass ($m$) be supported on the grids shown in Figs. 1 to 3, or on the modified grid shown in Fig. 4, the bottom of said mass is disposed or raised a suitable distance above the bottom of the box 1, thereby leaving a distributing chamber C for the inflowing gas coming from the retorts. To support the bottom grid above the bottom of the purifier-box, the castings 4 are not indispensable, and in lieu thereof I may substitute the conventional steel frame usually employed for supporting the ordinary grid to which reference was made at the outset in this specification. An example of such a steel frame is illustrated in Figs. 5 to 7 inclusive, and comprises a marginal angle-bar frame 9 disposed along and secured to, the walls of the purifier box, there being supported on said frame at an intermediate point across the box a bar 10, sagging of said bar being prevented by posts or struts 11 whose bases 11' rest on the bottom of the purifier box. In this modification a portion of the timbers or lower grid-members $a$ rest directly on the frame 9 and the cross-bar 10 (the adjacent notched ends of the timbers meeting at the longitudinal center of the bar 10) another portion $b$ of said bottom grid-timbers or members resting in the depressions or saddles $d'$ formed in the castings or grid supports 12 whose upper ends are provided with saddles or pockets $7'$ for the support of the timbers $a'$ constituting the upper or supplemental grid. In the modification referred to, the castings 12 are directly supported by the timbers $a$ (Fig. 7) the pockets $d'$, $d'$, terminating in the horizontal portions or hangers $h$, $h$, which when deposited on the timbers $a$ serve to support the castings 12 directly on said timbers. The pockets are separated by an extension division wall or partition $w$ (Fig. 7), which not only spaces apart the timbers $b$, $b$, but contributes to a firm support for said timbers when once deposited in the pockets.

So far as the general arrangement of the timbers $a$, $b$, and $a'$, in this last modification is concerned, it is apparent from an inspection of the drawings (Fig. 7) that it does not differ from that shown in Fig. 3, the differences residing merely in the specific means by which the support and spacing of the grid timbers is effected. A still further modification is shown in Fig. 8 where a series of bottom-grid timbers $a$ resting on the frame 9 are spaced apart by a series of tongues 13 disposed along the bottom of a grid support 14 resting on the timbers, the upper portion of said support terminating in pockets or saddles $7''$ which carry the upper grid-members $a'$.

It will be seen from the foregoing that whatever modification or form the improvement may assume, it is in all cases characterized by the basic feature of a bottom or main grid, and an upper or supplemental grid disposed at a higher level whereby the points of support for the mass are distributed in distinct and superposed planes, and the packing of the material is thus entirely avoided. Furthermore, whatever form the improvement assumes, whether provided with a coarse supplemental grid or not, it embodies as an element of its construction, means for spacing the grid members apart, each member (a timber or its equivalent) being detachable and removable from its support whereby access may readily be had to any portion of the interior of the purifier-box at a moment's notice. The grid may be readily dismantled and as quickly assembled; it seldom requires repairing, is comparatively cheap, durable and may be applied to any conventional form of purifier box. The form shown in Fig. 4 is perhaps the most desirable for the reason that the grid members or timbers $a$, $a''$, of the bottom grid are staggered so as to be disposed in superposed planes, thereby still further emphasizing the advantage flowing from a support of the mass at points distributed in distinct planes.

In the various forms of grid described it will be noticed that any grid is composed of a number of "sections"; a section comprising two or more castings or supports 4 (or their equivalents such as the members 12, 14) alined in the direction of one of the horizontal dimensions of the box (in the present example, the length of the box), with their complement of timbers or stringers $a$ ($a'$, $a''$), the several sections being placed side by side, and collectively forming the entire grid. In Fig. 3 for example, the juxtaposed supports 4, 4, with their complement of timbers $a$, $a'$, would represent two adjacent grid sections (or more properly a cross-section of two grid-sections, being that the figure represents a vertical cross-section on the line 3—3 of Fig. 1). The same is true of Fig. 4 where a vertical cross-section of two juxtaposed grid-sections is shown. The "castings" 4 need not of course be of cast metal, any equivalent being contemplated by the term "casting". A grid having two sets of grids disposed in superposed planes may for convenience be termed a "composite" grid; and while all the forms here shown have this characteristic, the omission of the upper grid or "deck" is not to be considered as a total departure from my invention, the spacing means for the lower set of timbers (with or without the extensions which support the upper set of timbers) constituting one of the features of the present improvement.

The operation is the same as in any purifier-box, the impure gas entering through the pipe P from the retorts, then entering the bottom chamber C, (that is to say the gas-distributing chamber below the bottom grid) whence it is forced through the mass $m$ beneath the hood 3 and finally escapes in a purified state through the pipe P' into the gasometer or other container (not shown).

The timbers $a$ forming the lower grid in Fig. 3, are substantially of $2''\times 4''$ dimension. By substituting a $2''\times 2''$ timber for each alternate member $a$ shown in said figure, we may secure a staggered arrangement very much on the order of that shown in the lower grid in Fig. 4 where all the timbers ($a$, $a''$) are of equal dimensions. We might even secure a staggered arrangement in Fig. 7 by using $2''\times 2''$ timbers for the members $b$. In fact, the invention is susceptible of numerous modifications.

Having described my invention, what I claim is:—

1. A grid-support comprising a member having a top surface for the deposit of suitable grid-members, tongues projecting from said surface for spacing apart the members so deposited, extensions leading upward from the member and terminating at points above the depositing surface aforesaid, and serving to support complementary grid-members.

2. A grid-support comprising a member having a top surface for the deposit of suitable grid-members, tongues projecting from said surface for spacing apart the members so deposited, extensions leading upward from the member and terminating at points above the depositing surface aforesaid and serving to support complementary grid members, the spacing between the latter being in excess of the spacing between the bottom grid-members.

3. A grid for purifier-boxes comprising a series of parallel grid members disposed at fixed distances apart, means for supporting said members at a given elevation above the bottom of the box, and a complementary series of parallel grid members carried by the same supporting means and disposed in a plane above the first set of grid members.

4. A grid-support comprising a member or casting having a top surface for the deposit of suitable grid-members, tongues projecting from said surface for spacing apart the members so deposited, extensions leading upward from the casting and terminating in a plane above the plane of the depositing surface aforesaid, pockets terminating the said extensions for the support of complementary grid-members, the spacing between contiguous pockets being in excess of the spacing between consecutive members forming the lower grid, whereby a coarse upper grid is formed by the members supported in the pockets.

5. A composite grid for purifier-boxes comprising a bottom grid having grid members spaced fixed distances apart and disposed in vertically staggered relation whereby a portion of the members is disposed at a higher level than another portion, and a coarse upper grid having grid members spaced at greater distances apart.

6. A grid-support having a top surface for the deposit of suitable grid-members disposed in a fixed horizontal plane, suitable depressions in said surface for receiving contiguous grid-members disposed in a lower plane, means for spacing the several members fixed distances apart, extensions leading from the support and terminating in grid-supporting pockets superposed vertically over the grid members occupying one of the planes aforesaid whereby the pockets are spaced apart a distance equal substantially to the width of the grid member deposited in the second plane, and a coarse grid is thereby formed of the grids supported in the pockets.

7. A grid-support comprising a body portion having an upper depositing surface for the support of suitable grid members, suitable vertical extensions leading from the support above said depositing surface, tongues interposed between the extensions and between an extension and one side of the support, the tongues and extensions being spaced equal distances apart and operating to hold the grid-members fixed distances apart, and means on the extensions for supporting a complementary set of grid members.

In testimony whereof I affix my signature, in presence of two witnesses.

ARCHIBALD S. B. LITTLE.

Witnesses:
Wm. H. Lindsey,
R. M. Davis.

---

Copies of this patent may be obtained for five cents each, by addressing the "Commissioner of Patents, Washington, D. C."